United States Patent
Inaba

(10) Patent No.: US 8,184,167 B2
(45) Date of Patent: May 22, 2012

(54) OPTICAL APPARATUS HAVING MAGNET MEMBER

(75) Inventor: Hiroyoshi Inaba, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 450 days.

(21) Appl. No.: 11/934,402

(22) Filed: Nov. 2, 2007

(65) Prior Publication Data

US 2008/0111890 A1 May 15, 2008

(30) Foreign Application Priority Data

Nov. 13, 2006 (JP) ................... 2006-307139

(51) Int. Cl.
*H04N 5/228* (2006.01)
*G03B 17/00* (2006.01)
*G02B 27/64* (2006.01)

(52) U.S. Cl. .................. 348/208.99; 348/208.3; 396/52; 396/55; 359/554; 359/557

(58) Field of Classification Search ............. 348/208.99, 348/208.3–208.16; 396/52–55; 359/554–557
See application file for complete search history.

(56) References Cited

U.S. PATENT DOCUMENTS

2004/0201707 A1* 10/2004 Noguchi et al. ........... 348/208.7
2006/0093339 A1* 5/2006 Umezu ............................ 396/55

FOREIGN PATENT DOCUMENTS

JP 10-311995 A 11/1998
JP 2006-003421 A 1/2006

* cited by examiner

*Primary Examiner* — Lin Ye
*Assistant Examiner* — Mekonnen Dagnew
(74) *Attorney, Agent, or Firm* — Cowan, Liebowitz & Latman, P.C.

(57) ABSTRACT

An electromagnetic driving apparatus includes a magnet member having a first face in which first and second magnetic poles are formed in a first direction and a second face in which the first and second magnetic poles are formed in a second direction, a first coil facing the first face, a second coil facing the second face, a first member holding the magnet member, and a second member holding the first and second coils. One of the first and second members holds a driven member. The first and second members are relatively moved in the first direction by the energization of the first coil, and the first and second members are relatively moved in the second direction by the energization of the second coil. The actuator constituted by the first and second coils and the magnet member can be compactly arranged in one region in the apparatus.

3 Claims, 7 Drawing Sheets

OPTICAL APPARATUS HAVING MAGNET MEMBER

BACKGROUND OF THE INVENTION

The present invention relates to an electromagnetic driving apparatus that drives a driven member and is suitable for, for example, an optical apparatus. The electromagnetic driving apparatus uses electromagnetic force generated between a coil and a magnet to drive an optical element such as a lens or a photoelectric conversion element such as an image-pickup element, for suppressing image shake caused by shake such as hand jiggling.

The optical apparatuses include a so-called image-stabilizing apparatus, an interchangeable lens and an image-pickup apparatus such as a video camera or a digital still camera which are equipped with the image-stabilizing apparatus.

The image-stabilizing apparatus disclosed in such as Japanese Patent Laid-Open No. 11-305277 detects shake such as hand jiggling to drive a lens, depending on the detection result, in a direction different from an optical axis direction (e.g., a direction perpendicular to the optical axis).

In this image-stabilizing apparatus, an electromagnetic actuator is constituted by a coil and a magnet, and electromagnetic force generated between the coil and the magnet by energization of the coil drives the lens in two axis directions (a pitch direction and a yaw direction) perpendicular to each other.

Further, in the image-stabilizing apparatus disclosed in Japanese Patent Laid-Open No. 11-305277, two electromagnetic actuators for driving the lens in the two axis directions are provided in two regions different in phase by 90 degrees when viewed in the optical axis direction. This increases the area (volume) of the image-stabilizing apparatus when viewed in the optical axis direction, which impedes the miniaturization of an interchangeable lens or a camera equipped with the image-stabilizing apparatus.

BRIEF SUMMARY OF THE INVENTION

The present invention provides an electromagnetic driving apparatus including an electromagnetic actuator for driving a driven member such as a lens in two axis directions, the actuator being compactly arranged in one region, and an optical apparatus equipped therewith.

According to an aspect, the present invention provides an electromagnetic driving apparatus including a magnet member having a first face in which a first magnetic pole and a second magnetic pole are formed in a first direction and a second face in which the first magnetic pole and the second magnetic pole are formed in a second direction different from the first direction, a first coil facing the first face, a second coil facing the second face, a first member holding the magnet member, and a second member holding the first and second coils. One of the first and second members holds a driven member. The first and second members are relatively moved in the first direction by the energization of the first coil, and the first and second members are relatively moved in the second direction by the energization of the second coil.

According to another aspect, the present invention provides an optical apparatus including the electromagnetic driving apparatus. The electromagnetic driving apparatus drives an optical element or a photoelectrical conversion element as a driven member.

Other aspects of the present invention will become apparent from the following description and the attached drawings.

DETAILED DESCRIPTION OF THE PREFERRED EMBODIMENTS

Exemplary embodiments of the present invention will hereinafter be described with reference to the accompanying drawings.

Embodiment 1

Figure 2:
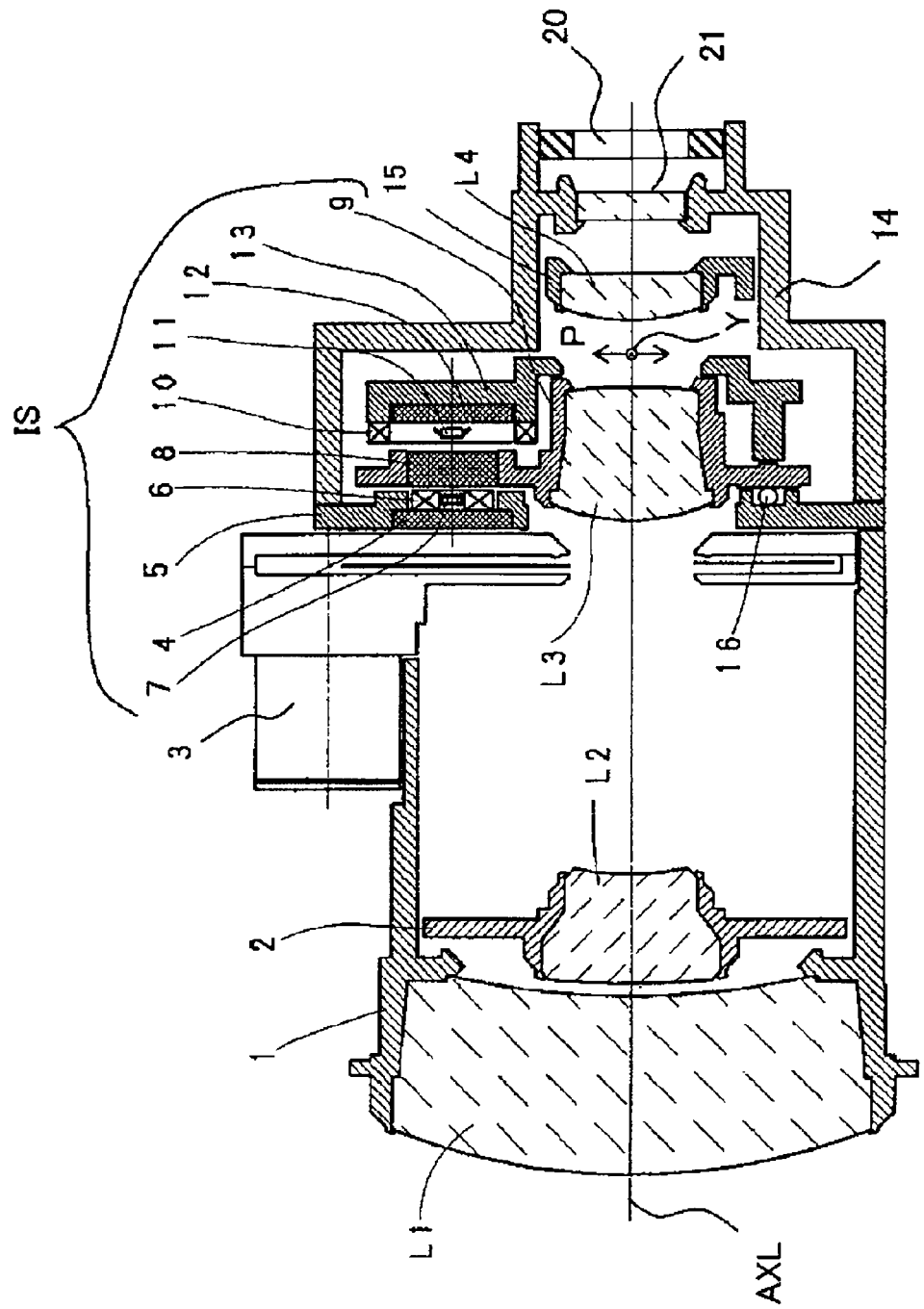
FIG. 2 is a sectional view of the video camera in Embodiment 1.

Description will be first made of the configuration of a video camera as an optical apparatus equipped with an image-stabilizing unit (electromagnetic driving apparatus) that is a first embodiment of the present invention with reference to FIG. 2.

The image-stabilizing unit (image-stabilizing apparatus) as an embodiment of the present invention can be equipped not only in the video camera but also in various optical apparatuses including an image-pickup apparatus such as a digital still camera and an interchangeable lens. Further, the image-stabilizing unit itself may also be an optical apparatus as an embodiment of the present invention.

Reference characters L1 to L4 denote first to fourth lens units that are arranged in order from an object side to an image side.

Reference numeral 1 denotes a fixed barrel holding the first lens unit L1, and 2 a variator-movable frame holding the second lens unit L2 and moving in an optical axis direction to vary the magnification of an image-pickup optical system described later.

Reference numeral 3 denotes a light-amount adjusting unit (aperture stop unit) appropriately adjusting the amount of light entering an image-pickup element 20.

The first to fourth lens units L1 to L4 and the light-amount adjusting unit 3 constitute the image-pickup optical system. The variator-movable frame 2 and part of light-amount adjusting unit 3 other than its actuator are disposed inside of the fixed barrel 1.

Reference numeral 5 denotes a shift base barrel fixed between the fixed barrel 1 and a mount barrel described later.

Description will hereinafter be continued with reference to FIGS. 1, 3A and 3B.

Reference numeral 4 denotes a first driving yoke fixedly held by the shift base barrel 5. Reference numeral 6 denotes a first driving coil fixed to the shift base barrel (second member) 5 via the first driving yoke 4. Reference numeral 7 denotes a first hall element serving as a position sensor for detecting the movement (position) of a driving magnet in a pitch direction P; the driving magnet will be described later. The first hall element 7 is disposed inside of the first driving coil 6 and fixed to the shift base barrel 5.

Reference numeral 8 denotes the driving magnet (magnet member) having a front face (object-side face) that is a first face and a rear face (image-side face) that is a second face. The front and rear faces of the driving magnet 8 are magnetized such that an S (south)-pole (first magnetic pole) and an N (north)-pole (second magnetic pole) are formed in each face. The arrangement direction of the S- and N-poles in the front face is different by 90 degrees from that of the S- and N-poles in the rear face.

Figure 1:
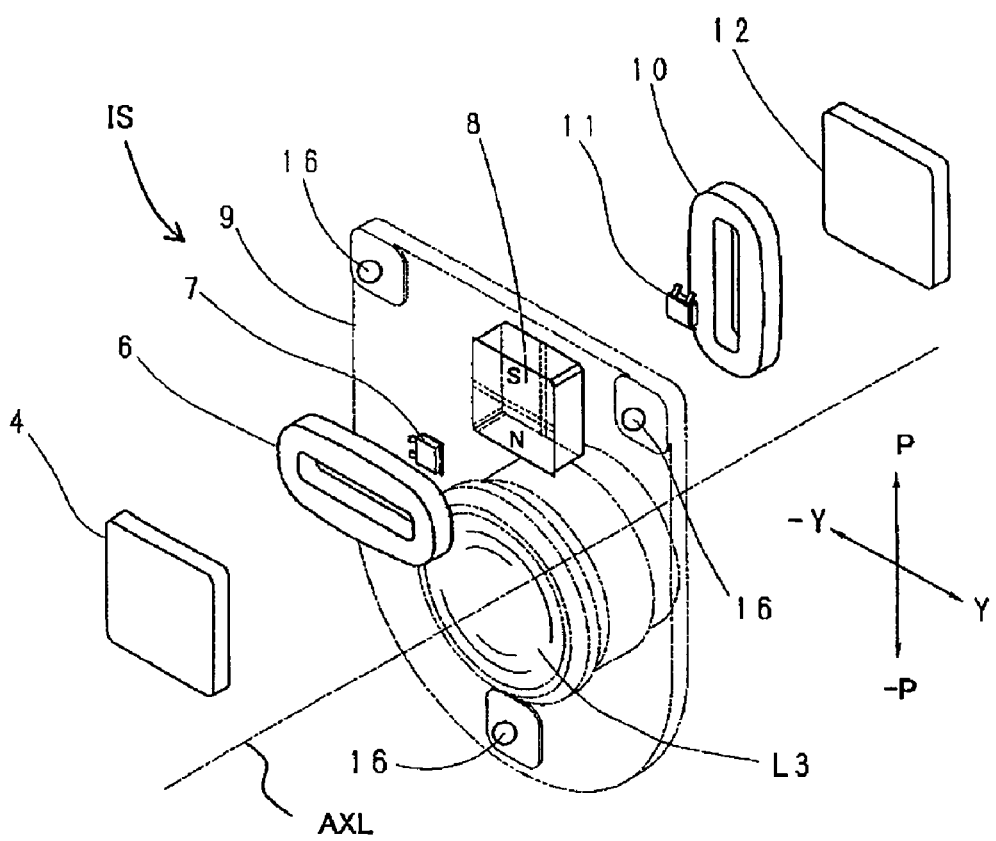
FIG. 1 is an exploded perspective view showing an image-stabilizing unit that is a first embodiment (Embodiment 1) of the present invention and equipped in a video camera.
Figure 3A:
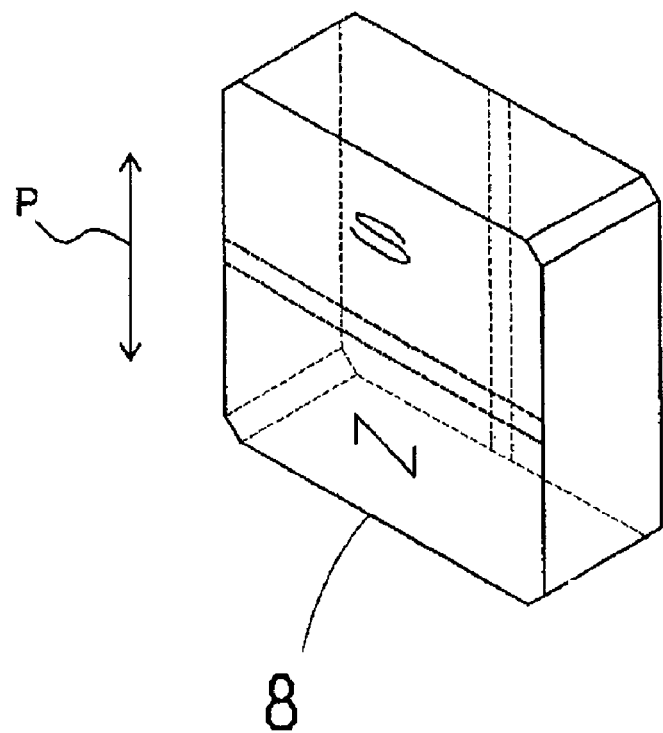
FIGS. 3A and 3B are a front perspective view and a rear perspective view respectively showing a driving magnet used for the image-stabilizing unit of Embodiment 1.
Figure 3B:
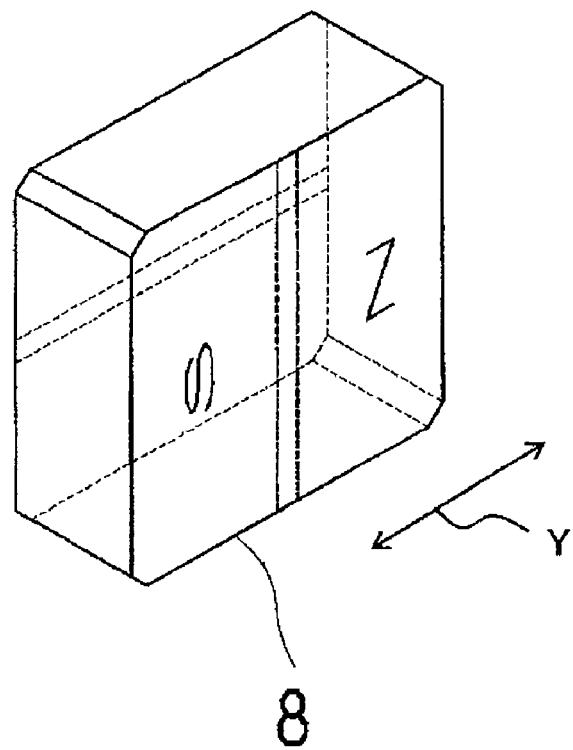

Specifically, as shown in FIGS. 1 and 3A, the S- and N-poles in the front face are arranged in the vertical direction corresponding to the pitch direction (first direction) P. In contrast, the S- and N-poles in the rear face are arranged in the horizontal direction corresponding to a yaw direction (second direction) Y.

Reference numeral 9 denotes a shift barrel (first member) disposed closer to an image plane (image side) than the shift base barrel 5, the shift barrel 9 holding the driving magnet 8 and the third lens unit (optical element) L3 and being moved in directions perpendicular to the optical axis AXL to suppress (or correct) image shake caused by shake of the video camera.

The movement direction of the optical element that is an driven member in the image-stabilizing apparatus as an embodiment of the present invention is not limited to the directions perpendicular to the optical axis AXL, and it may be any direction different from the optical axis direction.

Reference numeral 13 denotes a shift cover disposed closer to the image plane than the shift barrel 9, the shift cover 13 being integrally attached to the shift base barrel 5.

Reference numeral 12 denotes a second driving yoke fixedly held by the shift cover 13.

Reference numeral 10 denotes a second driving coil fixed to the shift cover (second member) 13 via the second driving yoke 12. Reference numeral 11 denotes a second hall element serving as a position sensor for detecting the movement (position) of the driving magnet 8 in the yaw direction Y. The second hall element 11 is disposed inside of the second driving coil 10 and fixed to the shift cover 13.

Reference numeral 16 denotes shift balls disposed between the shift barrel 9 and the shift base barrel 5. The shift balls 16 rotate and move with the movement (shift) of the shift barrel 9 in the directions perpendicular to the optical axis AXL to guide the movement of the shift barrel 9 and allow a smooth movement thereof. The shift balls 16 are disposed at three positions around the third lens unit L3.

The shift base barrel 5, the driving yokes 4, 12, the driving coils 6, 10, the driving magnet 8, the shift barrel 9, the third lens unit L3, the shift cover 13, the hall elements 7, 11 and the shift balls 16 constitute the image-stabilizing unit IS.

The mount barrel 14 holds the image-pickup element 20 and covers a focus barrel described later and part of the image-stabilizing unit IS other than the shift base barrel 5. The image-pickup element 20 is a photoelectric conversion element such as a CCD sensor or a CMOS sensor.

Reference numeral 15 denotes the focus barrel holding the fourth lens unit L4 and moving in the optical axis direction for focusing. Reference numeral 21 denotes an optical filter unit including an infrared-cutting filter and a low-pass filter, the optical filter unit 21 being disposed in the mount barrel 14 between the fourth lens unit L4 and the image-pickup element 20.

In the image-stabilizing unit IS, the first driving coil 6 is disposed between the first driving yoke 4 and the driving magnet 8 so as to face the front face of the driving magnet 8. Applying a voltage to the first driving coil 6 generates between the first driving coil 6 and the driving magnet 8 a driving force (electromagnetic force) in the pitch direction P. This driving force is controlled by the amplitude and direction (polarity) of the voltage applied to the first driving coil 6.

The first driving coil 6 is fixed to the shift base barrel 5, so that the shift barrel 9 and the third lens unit L3 are moved in the pitch direction P with the driving magnet 8 receiving the driving force in the pitch direction P.

On the other hand, the second driving coil 10 is disposed between the second driving yoke 12 and the driving magnet 8 so as to face the rear face of the driving magnet 8. Applying a voltage to the second driving coil 10 generates between the second driving coil 10 and the driving magnet 8 a driving force (electromagnetic force) in the yaw direction Y. This driving force is controlled by the amplitude and direction (polarity) of the voltage applied to the second driving coil 10.

The second driving coil 10 is fixed to the shift cover 13, so that the shift barrel 9 and the third lens unit L3 are moved in the yaw direction Y with the driving magnet 8 receiving the driving force in the yaw direction Y.

When the driving magnet 8 whose front and rear faces are respectively two-pole-magnetized is moved, the first hall element 7 facing the front face of the driving magnet 8 outputs an electrical signal in response to the change of a magnetic flux in the pitch direction P, and the second hall element 11 facing the rear face of the driving magnet 8 outputs an electrical signal in response to the change of a magnetic flux in the yaw direction Y.

The positional change of the driving magnet 8, that is, the shift barrel 9 in the pitch direction P can be detected based on the electrical signal from the first hall element 7. The positional change of the driving magnet 8, that is, the shift barrel 9 in the yaw direction Y can be detected based on the electrical signal from the second hall element 11. Thus, the two-dimensional movement of the shift barrel 9 can be detected.

Figure 4:
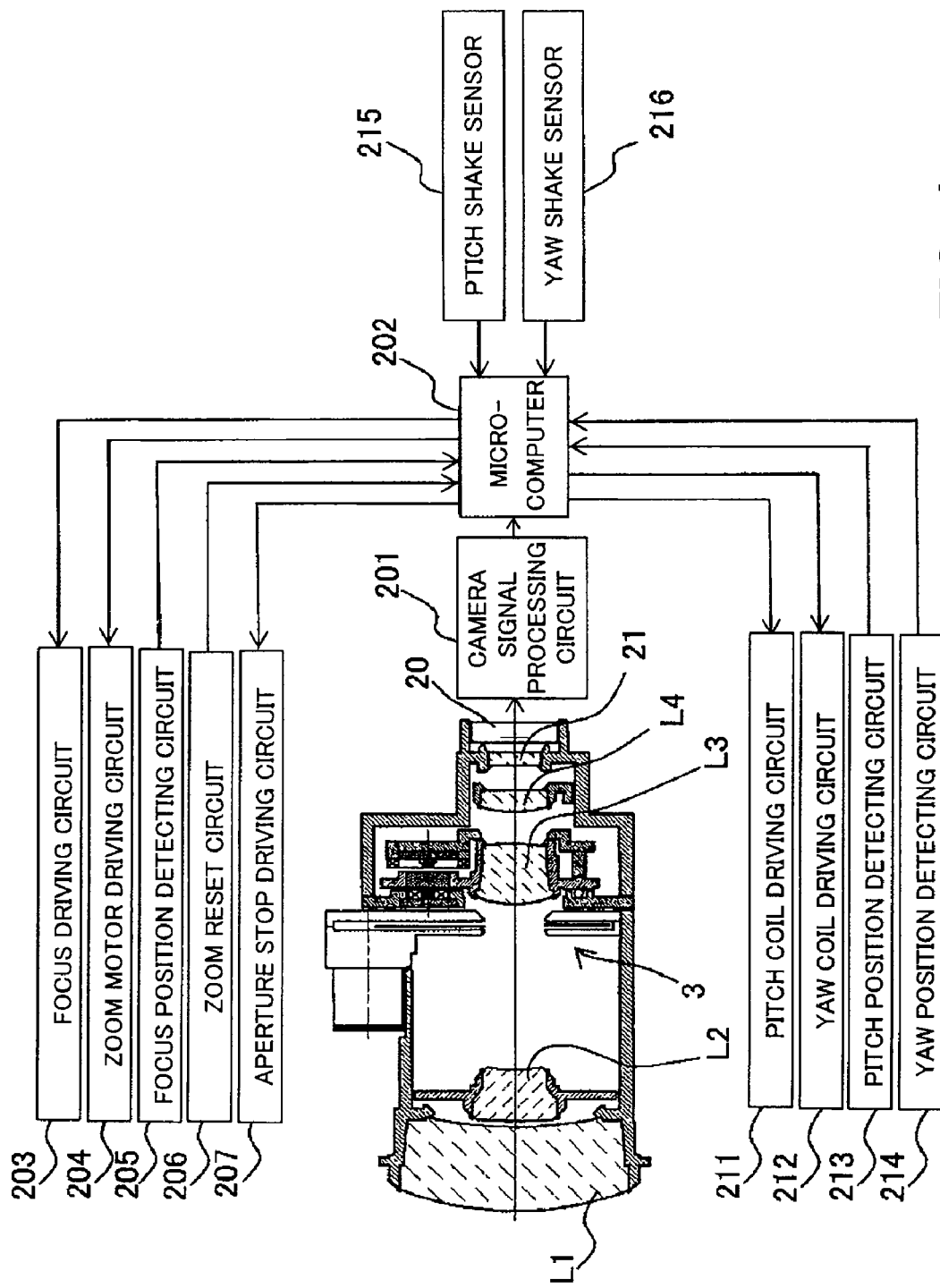
FIG. 4 is a block diagram showing the electrical configuration of the video camera of Embodiment 1.

FIG. 4 shows the electrical configuration of the video camera of this embodiment.

The output signal from the image-pickup element 20 is subjected to various kinds of processing in a camera signal processing circuit 201, thereby being converted into a video signal. The video signal is displayed on a display device (not shown) and recorded to a recording medium (not shown) such as a semiconductor memory, an optical disc, a hard disk and a magnetic tape, through a microcomputer 202.

The microcomputer 202 receives signals from a zoom reset circuit 206 and a focus position detecting circuit 205, the zoom reset circuit 206 detecting whether or not the second lens unit L2 is located at a reference position, and the focus position detecting circuit 205 detecting the position of the fourth lens unit L4. The microcomputer 202 controls a zoom motor driving circuit 204 and a focus driving circuit 203 with reference to these signals to cause them to perform zoom drive and focus drive.

Further, the microcomputer 202 controls an aperture-stop-unit driving circuit 207 based on a luminance signal component extracted from the video signal to change the aperture diameter of the light-amount adjusting unit 3 to a diameter corresponding to an appropriate light amount.

Moreover, the microcomputer 202 receives shake signals from pitch and yaw shake sensors 215 and 216 that are equipped in the video camera and constituted by, for example, a vibrating gyro sensor. The microcomputer 202 calculates target drive positions of the shift barrel 9 in the pitch and yaw directions P and Y based on the shake signals.

The microcomputer 202 receives information on the position (detected position) of the shift barrel 9 from each of pitch and yaw position detecting circuits 213 and 214 respectively including the first and second hall elements 7 and 11.

Then, the microcomputer 202 controls the energization of the first and second driving coils 6 and 10 through the pitch and yaw coil driving circuits 211 and 212 such that the detected positions reaches the target drive positions in the pitch and yaw directions. In this manner, image-shake correction, that is, image stabilization is performed.

As understood from FIGS. 1 and 2, an electromagnetic actuator driving the shift barrel 9 in the pitch and yaw directions P and Y in the image-stabilizing unit IS is constituted by the two driving yokes 4, 12, the two driving coils 6, 10 and the driving magnet 8. In other words, the driving magnet 8 is used for both the drive of the shift barrel 9 in the pitch direction P and the drive thereof in the yaw direction Y.

This reduces the number of parts constituting the image-stabilizing unit IS as compared to a conventional case of using two electromagnetic actuators each including a coil and a magnet, thereby resulting in facilitation of assembly and reduction in cost.

Further, magnets are generally heavy for their size, which is disadvantageous for driving the shift barrel in the image-stabilizing unit IS of this embodiment that is a so-called moving-magnet type image-stabilizing unit. However, in this embodiment, only one driving magnet 8 is provided for driving the shift barrel 9 in the two axis directions, so that the weight supported by the shift barrel 9 can be reduced. This makes it possible to drive for image stabilization with high speed and high accuracy.

In addition, when viewing the image-stabilizing unit IS in the optical axis direction (direction in which light passes through the unit IS), the two driving yokes 4, 12, the two driving coils 6, 10 and the driving magnet 8 are collectively arranged in an upper region of the image-stabilizing unit IS.

This makes it possible to reduce the area (volume) of the image-stabilizing unit IS when viewed in the optical axis direction as compared to a conventional case where two electromagnetic actuators are arranged in two regions that are different in phase by 90 degrees. Therefore, the miniaturization of the image-stabilizing unit IS and the video camera equipped therewith can be achieved.

Embodiment 2

The description of the moving-magnet type image-stabilizing unit IS was made in Embodiment 1 in which the driving magnet 8 is moved together with the shift barrel 9. In contrast, description will be made of a so-called moving-coil type image-stabilizing unit in Embodiment 2 in which the driving coil is moved together with the shift barrel.

Figure 5:
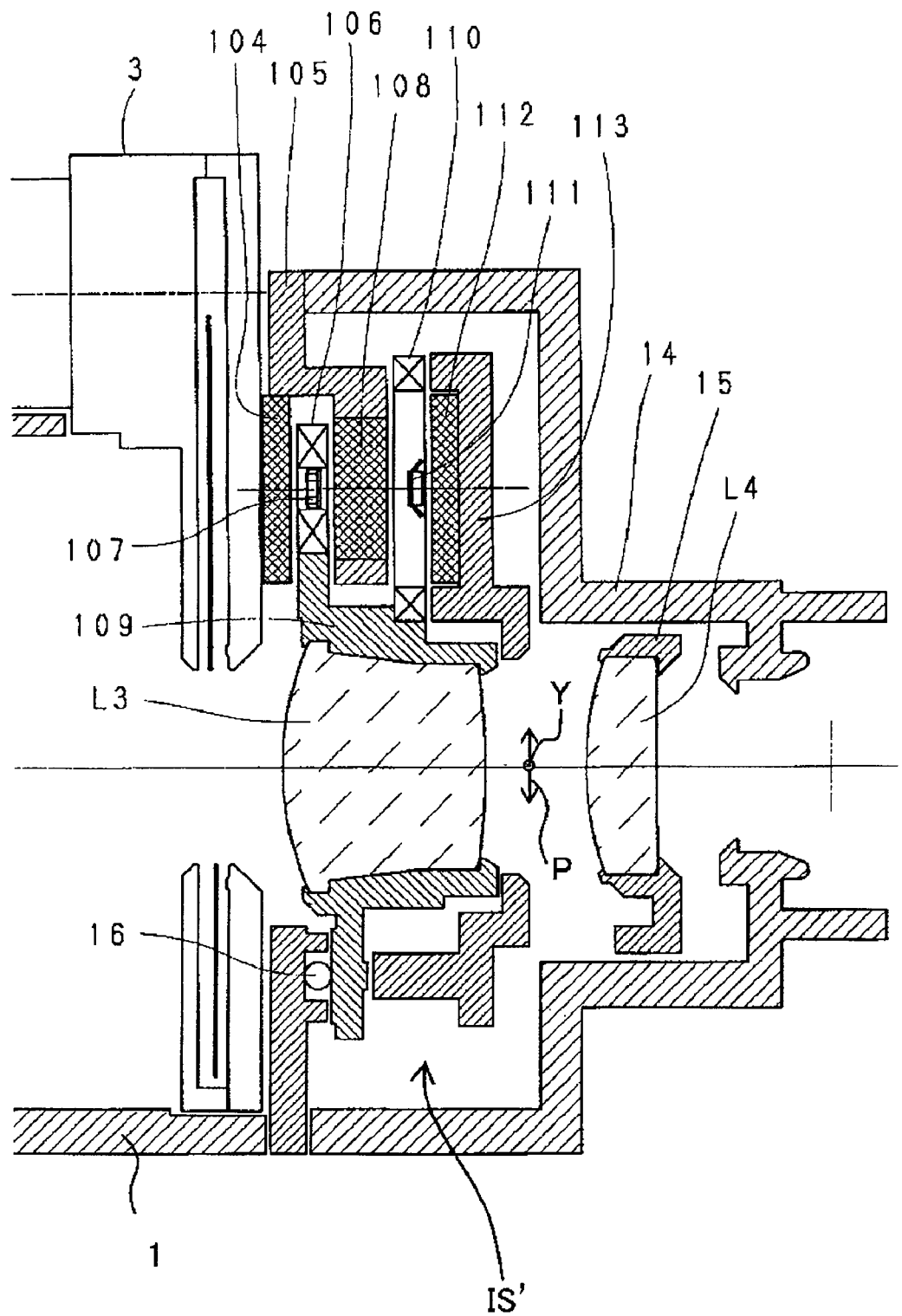
FIG. 5 is a sectional view of an image-stabilizing unit that is a second embodiment (Embodiment 2) of the present invention and equipped in a video camera.

FIG. 5 shows part of a video camera equipped with the moving-coil type image-stabilizing unit IS' that is a second embodiment of the present invention.

Components identical to those in Embodiment 1 are designated with the same reference numerals and reference characters used in Embodiment 1 and detailed description thereof is omitted. The electrical configuration of the video camera in this embodiment is the same as that shown in FIG. 4.

Reference numeral 105 denotes a shift base barrel fixed between the fixed barrel 1 and the mount barrel 14. Reference numeral 104 denotes a first driving yoke fixedly held by the shift base barrel 105.

Reference numeral 108 denotes a driving magnet fixedly held by the shift base barrel (first member) 105, the driving magnet 108 being disposed closer to the image plane than and spaced apart from the first driving yoke 104.

The front and rear faces of the driving magnet 108 are magnetized such that an S-pole and an N-pole are formed in each face, as in Embodiment 1. The arrangement direction of the S- and N-poles in the front face is different by 90 degrees from that of the S- and N-poles in the rear face. Specifically, as shown in FIGS. 3A, the S- and N-poles in the front face are arranged in the pitch direction P. In contrast, the S- and N-poles in the rear face are arranged in the yaw direction Y.

Reference numeral 106 denotes a first driving coil fixed to a shift barrel (second member) 109, the first driving coil 106 being disposed between the first driving yoke 104 and the driving magnet 108.

Reference numeral 113 denotes a shift cover disposed closer to the image plane than the shift barrel 109, the shift cover 113 being integrally attached to the shift base barrel 105.

Reference numeral 112 denotes a second driving yoke fixedly held by the shift cover 113, the second driving yoke 112 being disposed closer to the image plane than and spaced apart from the driving magnet 108. Reference numeral 110 denotes a second driving coil fixed to the shift barrel 109, the second driving coil 110 being disposed between the driving magnet 108 and the second driving yoke 112.

Reference numeral 107 denotes a first hall element serving as a position sensor for detecting the movement (position) of the driving magnet 108 in the pitch direction P. The first hall element 107 is disposed inside of the first driving coil 106 and fixed to the shift barrel 109.

Reference numeral 111 denotes a second hall element serving as a position sensor for detecting the movement (position) of the driving magnet 108 in the yaw direction Y. The second hall element 111 is disposed inside of the second driving coil 110 and fixed to the shift barrel 109.

In the image-stabilizing unit IS', applying a voltage to the first driving coil 106 generates between the first driving coil 106 and the driving magnet 108 a driving force (electromagnetic force) in the pitch direction P. This driving force is controlled by the amplitude and direction (polarity) of the voltage applied to the first driving coil 106. The first driving coil 106 is fixed to the shift barrel 109, so that the shift barrel 109 and the third lens unit L3 are moved in the pitch direction P with the first driving coil 106 receiving the driving force in the pitch direction P.

On the other hand, applying a voltage to the second driving coil 110 generates between the second driving coil 110 and the driving magnet 108 a driving force (electromagnetic force) in the yaw direction Y. This driving force is controlled by the amplitude and direction (polarity) of the voltage applied to the second driving coil 110. The second driving coil 110 is fixed to the shift barrel 109, so that the shift barrel 109 and the third lens unit L3 are moved in the yaw direction Y with the second driving coil 110 receiving the driving force in the yaw direction Y.

When the first and second driving coils 106 and 110 are moved with respect to the driving magnet 108 whose front and rear faces are respectively two-pole-magnetized, the first hall element 107 facing the front face of the driving magnet 108 outputs an electrical signal in response to the change of a magnetic flux in the pitch direction P, and the second hall element 111 facing the rear face of the driving magnet 108 outputs an electrical signal in response to the change of a magnetic flux in the yaw direction Y.

The positional change of the first driving coil 106, that is, the shift barrel 109 in the pitch direction P can be detected based on the electrical signal from the first hall element 107. The positional change of the second driving coil 110, that is, the shift barrel 109 in the yaw direction Y can be detected based on the electrical signal from the second hall element 111. Thus, the two-dimensional movement of the shift barrel 109 can be detected.

In the image-stabilizing unit IS' in this embodiment, an electromagnetic actuator driving the shift barrel 109 in the pitch and yaw directions P and Y is constituted by the two driving yokes 104, 112, the two driving coils 106, 110 and the driving magnet 108. In other words, the driving magnet 108 is used for both the drive of the shift barrel 109 in the pitch direction P and the drive thereof in the yaw direction Y.

This reduces the number of parts constituting the image-stabilizing unit IS' as compared to a conventional case of using two electromagnetic actuators each including a coil and a magnet, thereby resulting in facilitation of assembly and reduction in cost.

Further, when viewing the image-stabilizing unit IS' in the optical axis direction, the two driving yokes 104, 112, the two driving coils 106, 110 and the driving magnet 108 are collectively arranged in an upper region of the image-stabilizing unit IS'.

This makes it possible to reduce the area (volume) of the image-stabilizing unit IS' when viewed in the optical axis direction as compared to a conventional case where two electromagnetic actuators are arranged in two regions that are different in phase by 90 degrees. Therefore, the miniaturization of the image-stabilizing unit IS' and the video camera equipped therewith can be achieved.

Embodiment 3

Figure 6:
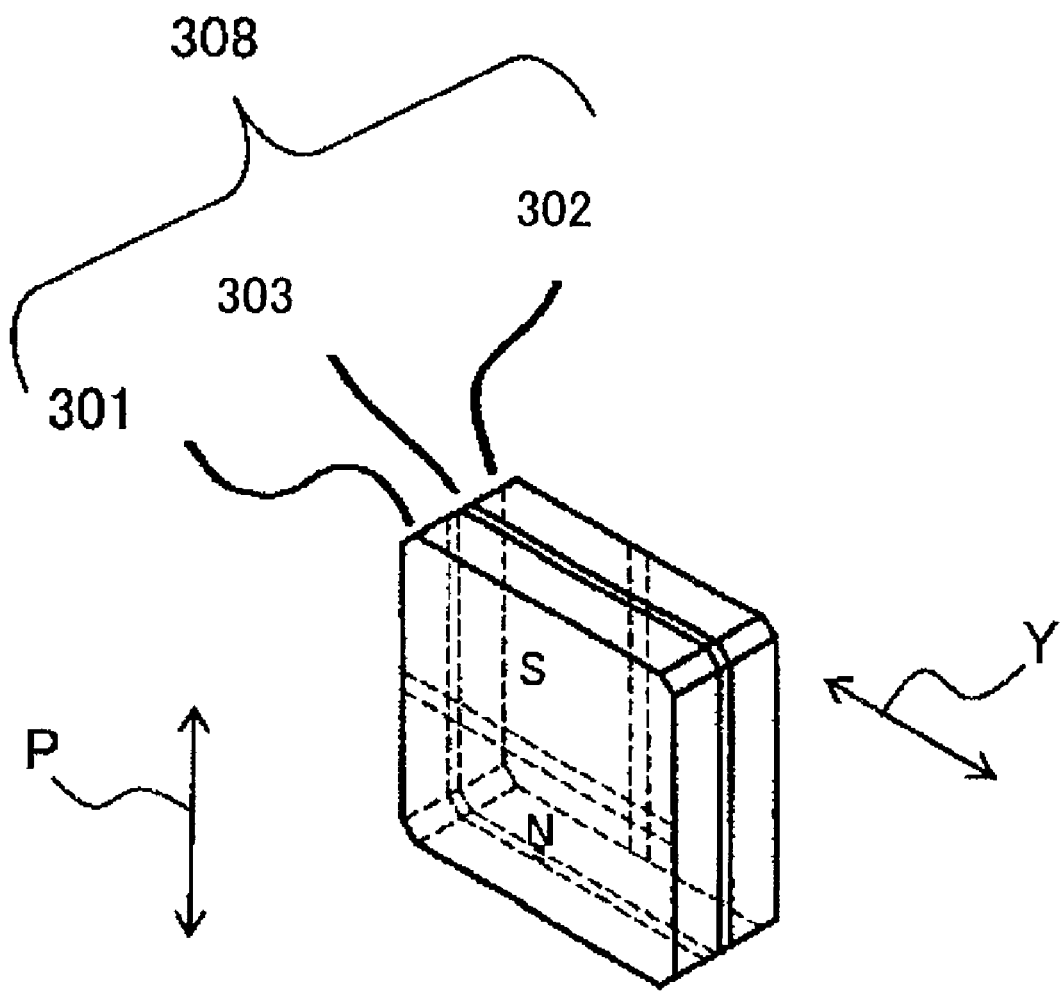
FIG. 6 is a front perspective view showing a driving magnet used for an image-stabilizing unit that is a third embodiment (Embodiment 3) of the present invention.
Figure 7:
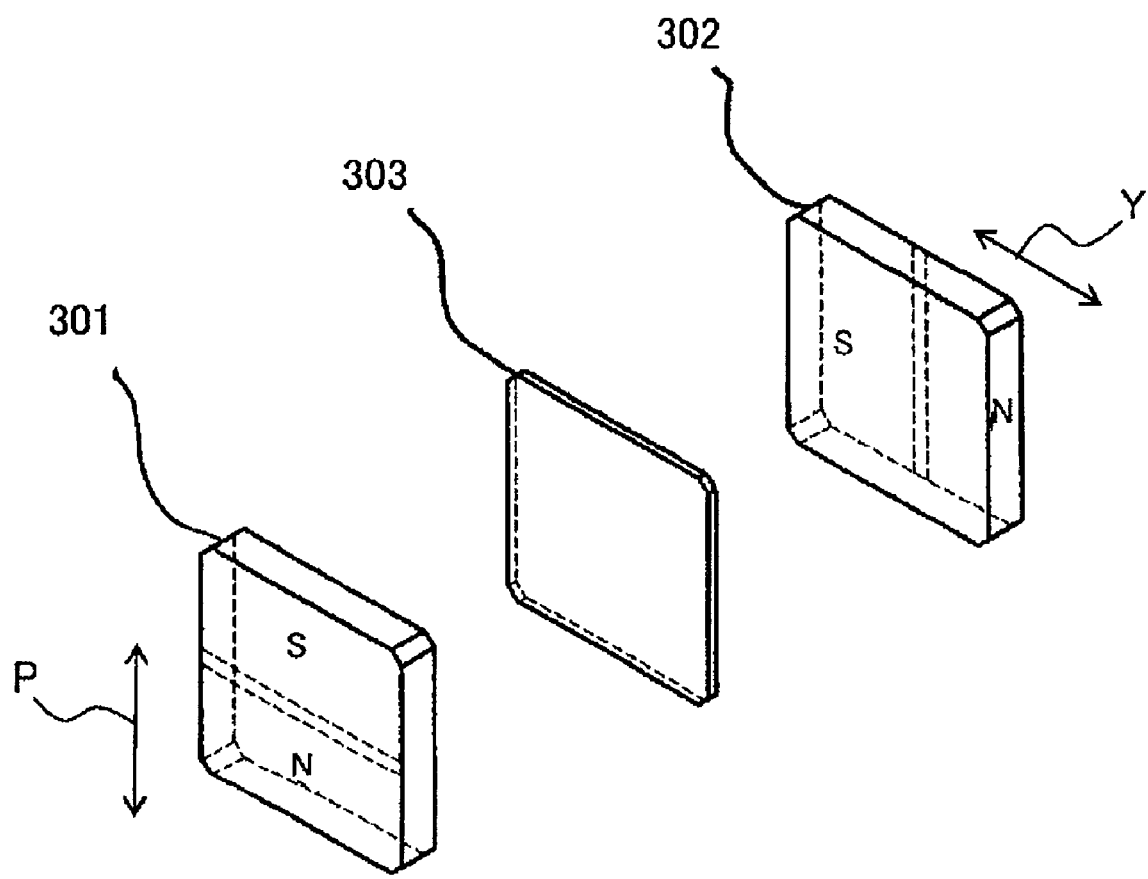
FIG. 7 is an exploded perspective view showing a driving magnet in Embodiment 3.

FIGS. 6 and 7 show a driving magnet used for an image-stabilizing unit that is a third embodiment of the present invention.

The driving magnet 308 is constituted by a first magnet plate 301, a second magnet plate 302 and a magnetic plate 303 that is an intermediate member disposed between the first and second magnet plates 301 and 302.

The front face of the first magnet plate 301 is magnetized such that an S-pole and an N-pole are arranged in the pitch direction P. The rear face of the second magnet plate 302 is magnetized such that an S-pole and an N-pole are arranged in the yaw direction Y.

The magnetic plate 303 is formed of a magnetic material such as iron. The first and second magnet plates 301 and 302 are respectively absorbed to the front and rear faces of the magnetic plate 303.

The integration of the first and second magnet plates 301, 302 and the magnetic plate 303 by magnetic adsorption can provide the driving magnet 308 having a function equivalent to that of the driving magnets 8 and 108 in Embodiments 1 and 2.

According to this embodiment, it is possible to separately produce the front-side part (first magnet plate 301) of the driving magnet 308 and the rear-side part (second magnet plate 302) thereof. This makes it possible to produce a desired driving magnet 308 only by first producing two magnet plates in which the S- and N-poles are formed in the same direction and then combining the two magnet plates different in direction from each other by 90 degrees with the magnetic plate 303.

The description was made of the image-stabilizing unit in which the shift barrel holding the lens unit that is the driven member is moved in the directions perpendicular to the optical axis in the above embodiments. However, an alternative embodiment of the present invention includes an image-stabilizing unit in which a member holding an image-pickup element as a driven member is moved in the directions perpendicular to the optical axis.

Further, the description was made of the image-stabilizing unit in the above embodiments. However, another alternative embodiment of the present invention includes an electromagnetic driving apparatus that vibrates a lens unit or an image-pickup element to eliminate dust therefrom. In this case, the direction of vibration may be same as or different from the optical axis direction.

Moreover, electromagnetic driving apparatuses as embodiments of the present invention can be used not only for optical apparatuses but also for various apparatuses driving a driven member in two axis directions.

As described above, according to each of Embodiments 1 to 3, the arrangement of the first and second driving coils on both sides of the magnet member can achieve a compact configuration of the electromagnetic actuator that drives a driven member such as an optical member or a photoelectric conversion element in the first and second directions. This can achieve the miniaturization of the electromagnetic driving apparatus and the optical apparatus equipped therewith.

Furthermore, the present invention is not limited to these embodiments and various variations and modifications may be made without departing from the scope of the present invention.

This application claims foreign priority benefits based on Japanese Patent Application No. 2006-307139, filed on Nov. 13, 2006, which is hereby incorporated by reference herein in its entirety as if fully set forth herein.

What is claimed is:

1. An optical apparatus comprising:
a single driving magnet including a first face as an object-side face in which a first magnetic pole and a second magnetic pole are formed in a first direction different from an optical axis direction and a second face as an image-side face which is located on a reverse side to the first face in the optical axis direction and in which the first magnetic pole and the second magnetic pole are formed in a second direction different from the optical axis direction and the first direction;
a first driving coil facing the first face of the driving magnet;
a second driving coil facing the second face of the driving magnet;
a first member holding the driving magnet;
a second member holding the first and second driving coils; and
a driven member held by one of the first and second members, the driven member being an optical element or a photoelectrical conversion element,
wherein the one of the first and second members which holds the driven member is moved in the first direction by a driving force generated by the energization of the first driving coil, and the one of the first and second members which holds the driven member is moved in the second direction by a driving force generated by the energization of the second driving coil, and
wherein, when viewed in the optical axis direction, the first coil, the first and second faces of the driving magnet and the second coil are arranged in one same phase region around the optical axis.

2. An optical apparatus according to claim 1, wherein the driving magnet is constituted by:
a first magnet having the first face;
a second magnet having the second face; and
an intermediate member formed of a magnetic material and disposed between the first and second magnets.

3. An optical apparatus according to claim 1, wherein the optical apparatus performs image stabilization.

* * * * *